(12) United States Patent
Ishikawa et al.

(10) Patent No.: US 9,876,201 B2
(45) Date of Patent: Jan. 23, 2018

(54) ELECTRIC WORKING MACHINE AND ELECTRIC WORKING MACHINE SYSTEM

(71) Applicant: HITACHI KOKI CO., LTD., Tokyo (JP)

(72) Inventors: Megumi Ishikawa, Ibaraki (JP); Shingo Kosugi, Ibaraki (JP); Hirohisa Tomita, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 322 days.

(21) Appl. No.: 13/970,845

(22) Filed: Aug. 20, 2013

(65) Prior Publication Data

US 2014/0050963 A1    Feb. 20, 2014

(30) Foreign Application Priority Data

Aug. 20, 2012 (JP) ................. 2012-181390

(51) Int. Cl.
*H01M 2/10* (2006.01)
*H01M 6/50* (2006.01)
*A01D 34/90* (2006.01)

(52) U.S. Cl.
CPC ........ *H01M 2/1022* (2013.01); *A01D 34/902* (2013.01); *H01M 2/1033* (2013.01); *H01M 6/5027* (2013.01); *H01M 2/1005* (2013.01); *H01M 2220/30* (2013.01)

(58) Field of Classification Search
None
See application file for complete search history.

(56) References Cited

U.S. PATENT DOCUMENTS

| 3,959,879 | A | * | 6/1976 | Sellers | ........... | A01D 34/84 30/276 |
| 5,181,369 | A | * | 1/1993 | Everts | ........... | A01D 34/78 30/276 |
| 2003/0122523 | A1 | * | 7/2003 | Kim | ........... | H02J 7/007 320/112 |
| 2006/0236741 | A1 | * | 10/2006 | Saitou | ........... | B21D 53/26 72/348 |
| 2008/0012526 | A1 | * | 1/2008 | Sadow | ........... | H02J 7/0044 320/111 |
| 2011/0131816 | A1 | * | 6/2011 | Ito | ........... | A01D 34/90 30/276 |
| 2011/0179757 | A1 | | 7/2011 | Scott-Stanbridge et al. | | |

FOREIGN PATENT DOCUMENTS

| CN | 2874784 Y * | 2/2007 |
| GB | 2 348 101 A | 9/2000 |
| JP | 1-134426 U | 9/1989 |

(Continued)

OTHER PUBLICATIONS https://www.engineersaustralia.org.au/sites/default/files/shado/Learned%20Groups/National%20Committee%20and%20Panels/Engineering%20Design/Part%202.pdf.*

(Continued)

*Primary Examiner* — Basia Ridley
*Assistant Examiner* — Zhongqing Wei
(74) *Attorney, Agent, or Firm* — Kenealy Vaidya LLP

(57) ABSTRACT

An electric working machine including: a housing to which a battery is configured to be detachably mounted, wherein the housing is configured such that a weight unit including a weight can be mounted to the housing.

10 Claims, 5 Drawing Sheets

(56) References Cited

FOREIGN PATENT DOCUMENTS

| JP | 7-36611 U | 7/1995 |
|---|---|---|
| JP | 2006-288296 A | 10/2006 |
| JP | 2008-265374 A | 11/2008 |
| JP | 2009-72149 A | 4/2009 |
| JP | 2010-200673 A | 9/2010 |

OTHER PUBLICATIONS

General Notes on Engineering Hardware, by Alex Churches AM, School of Mechanical and Manufacturing Engineering, The University of New South Wales, Intended primarily for reference purposes by students in the School, Nov. 2010. Part 1 and Part 2.*
Japanese Office Action for the related Japanese Patent Application No. 2012-181390 dated Sep. 2, 2015.

* cited by examiner

ELECTRIC WORKING MACHINE AND ELECTRIC WORKING MACHINE SYSTEM

CROSS-REFERENCE TO RELATED APPLICATIONS

This application claims priority from Japanese Patent Application No. 2012-181390 filed on Aug. 20, 2012, the entire contents of which are incorporated herein by reference.

TECHNICAL FIELD

Aspects of the present invention relate to an electric working machine such as an electric bush cutter.

BACKGROUND

For example, as disclosed in JP-A-2010-200673, an electric bush cutter has a long shape extending in the front-rear direction as a whole. A worker performs a mowing operation in a state of positioning a cutting blade on the front side of the electric bush cutter near the ground while wearing a shoulder band of the electric bush cutter to support the entire weight thereof. For this purpose, the electric bush cutter is preferably balanced in the front-rear direction so that the cutting blade on the front side is located in the vicinity of the ground, even when a force is not applied thereto in particular.

Meanwhile, when using a cordless electric working machine having a battery pack detachably mounted thereto, there is often a case that electric power is supplied to the electric working machine from an external power source such as a backpack type power supply device (backpack power source). Since the external power source has a large capacity, as compared to a battery pack which is directly and detachably attached to the cordless electric working machine, the external power source is suitable for a long-time work. When the electric power is supplied from the external power source instead of the battery pack, an adapter on a leading end of a cable extending from the external power source is mounted to the electric working machine. Since the adapter does not include a battery cell therein, the adapter is lightweight, as compared to the battery pack. Accordingly, when the adapter instead of the battery pack is mounted to the cordless electric working machine, a gravity center position of the electric working machine is changed, as compared to a case of mounting the battery pack. Further, since the weight of the battery pack also varies depending on the capacity thereof, the gravity center position is changed according to the capacity of the battery pack to be mounted. Particularly, in a case of a working machine in which heavy objects are located at both ends of an elongated operation rod such as a bush cutter, there is a problem that the working machine is greatly affected by moment.

A gravity center position for the optimal front and rear balance of an electric bush cutter is changed in accordance with product specifications such as a length in the front and rear direction of the electric bush cutter and positions and lengths of a length adjustment unit and a shoulder band and is also different in accordance with a height, body type, feeling, etc. of a worker. Additionally, when the gravity center position of the electric working machine is changed depending on whether a battery pack of any capacity is mounted to perform a work or whether, instead of the battery pack, an adapter on a leading end of a cable extending from an external power source is mounted to perform a work, a sense of discomfort is given to a worker.

SUMMARY

The present invention has been made in consideration of the above-described circumstances and an object of the present invention is to provide an electric working machine whose gravity center position can be adjusted.

Another object of the present invention is to provide an electric working machine which is capable of reducing the change in the gravity center position between when being operated by electric power of a battery pack and when being operated by electric power from an external power source, as compared to a case where an adapter instead of the battery pack is mounted to the electric working machine.

According to an aspect of the present invention, there is provided an electric working machine including: a housing to which a battery is configured to be detachably mounted, wherein the housing is configured such that a weight unit including a weight can be mounted to the housing.

According to another aspect of the present invention, there is provided an electric working machine including: a housing, a battery mounted to the housing, and an adapter detachably mounted to the battery and configured to receive electric power from an external power source, wherein the electric working machine is configured to be operated by using the electric power from the external power source.

According to another aspect of the present invention, there is provided an electric working machine system including: an electric working machine including a housing: a battery configured to be detachably mounted to the housing; and a weight unit including a weight and configured to be detachably mounted to the housing.

According to an aspect of the present invention, it is possible to realize an electric working machine whose gravity center position can be adjusted.

According to another aspect of the present invention, it is possible to realize an electric working machine which is capable of reducing the change in the gravity center position between when being operated by electric power of a battery pack and when being operated by electric power from an external power source, as compared to a case where an adapter instead of the battery pack is mounted to the electric working machine.

DETAILED DESCRIPTION

Figure 1:
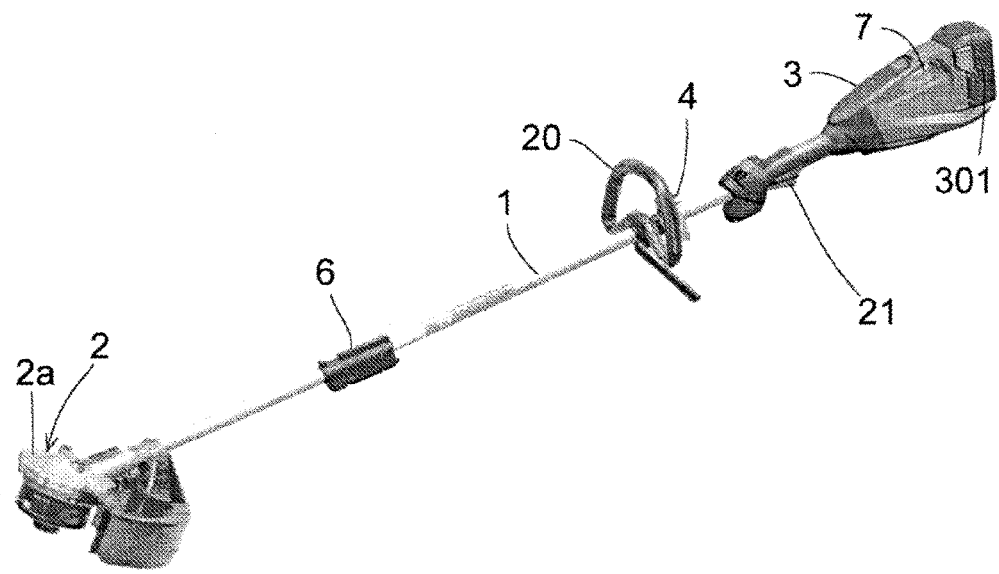
FIG. 1 is a perspective view of a bush cutter according to an illustrative embodiment of the present invention.

Hereinafter, a preferred embodiment of the present invention will be described in detail by referring to the accompanying drawings. The same or similar reference numerals are applied to the same or similar parts and elements throughout the drawings, and the duplicated description thereof will be omitted. Further, the embodiment is illustrative and not intended to limit the present invention. It should be noted that all the features and their combinations described in the embodiment are not necessarily considered as an essential part of the present invention.

Figure 2:
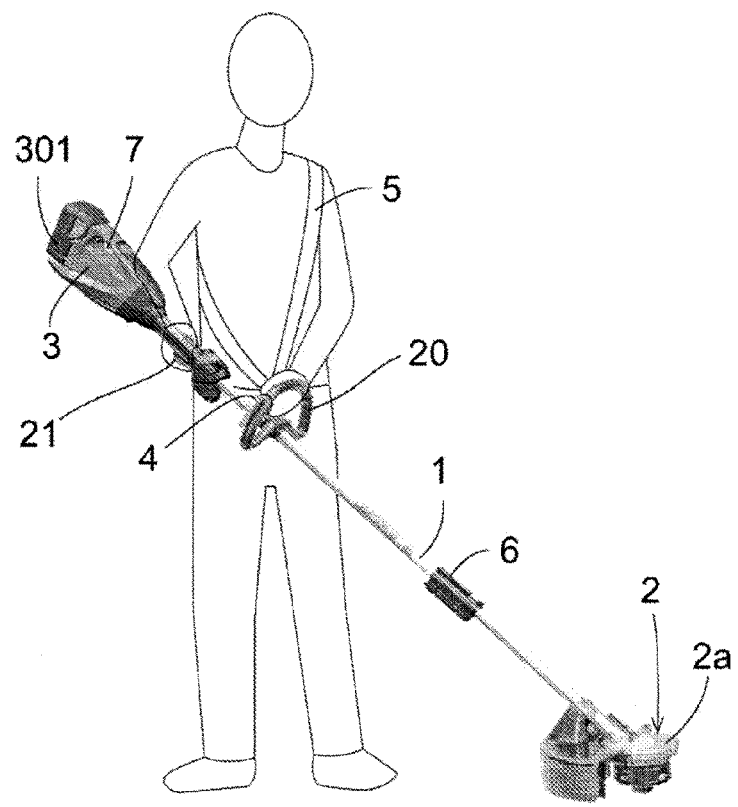
FIG. 2 is a schematic view showing a state where a worker holds the bush cutter of FIG. 1.
Figure 3:
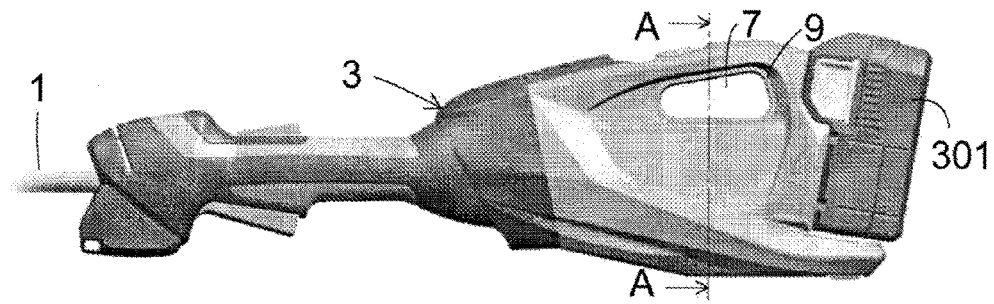
FIG. 3 is an enlarged side view showing a battery-side housing 3 of the bush cutter of FIG. 1.
Figure 4:
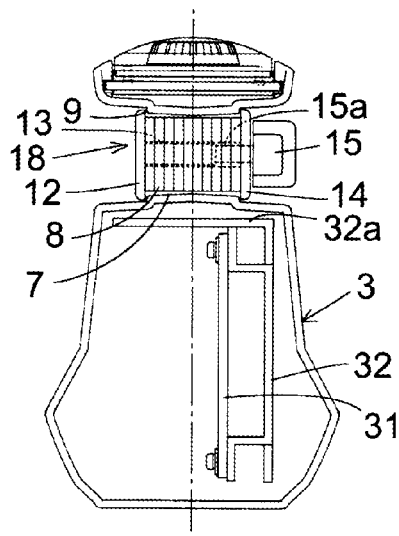
FIG. 4 is a sectional view taken along a line A-A of FIG. 3.
Figure 5A:
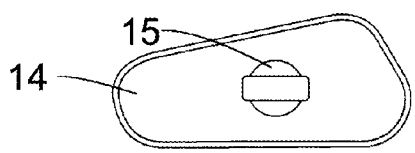
FIG. 5A is a front view of a weight unit 18 shown in FIG. 4.
Figure 5C:
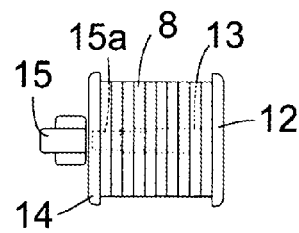
FIG. 5C is a right side view thereof and FIG. 5D is a rear view thereof.
Figure 5B:
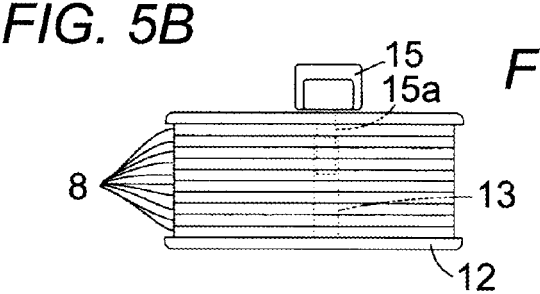
FIG. 5B is a bottom view thereof.
Figure 5D:
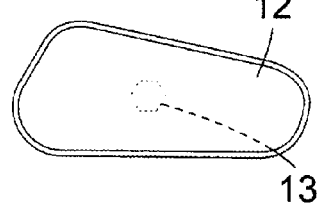
Figure 6:
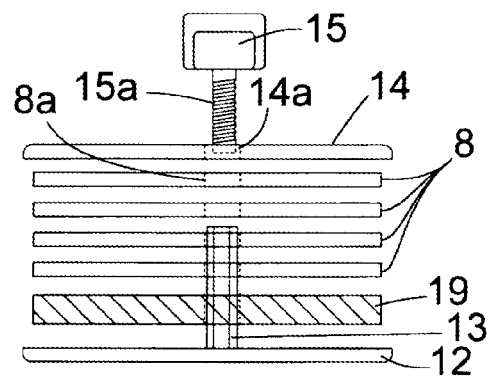
FIG. 6 is an exploded view of the weight unit 18 shown in FIG. 4.
Figure 7:
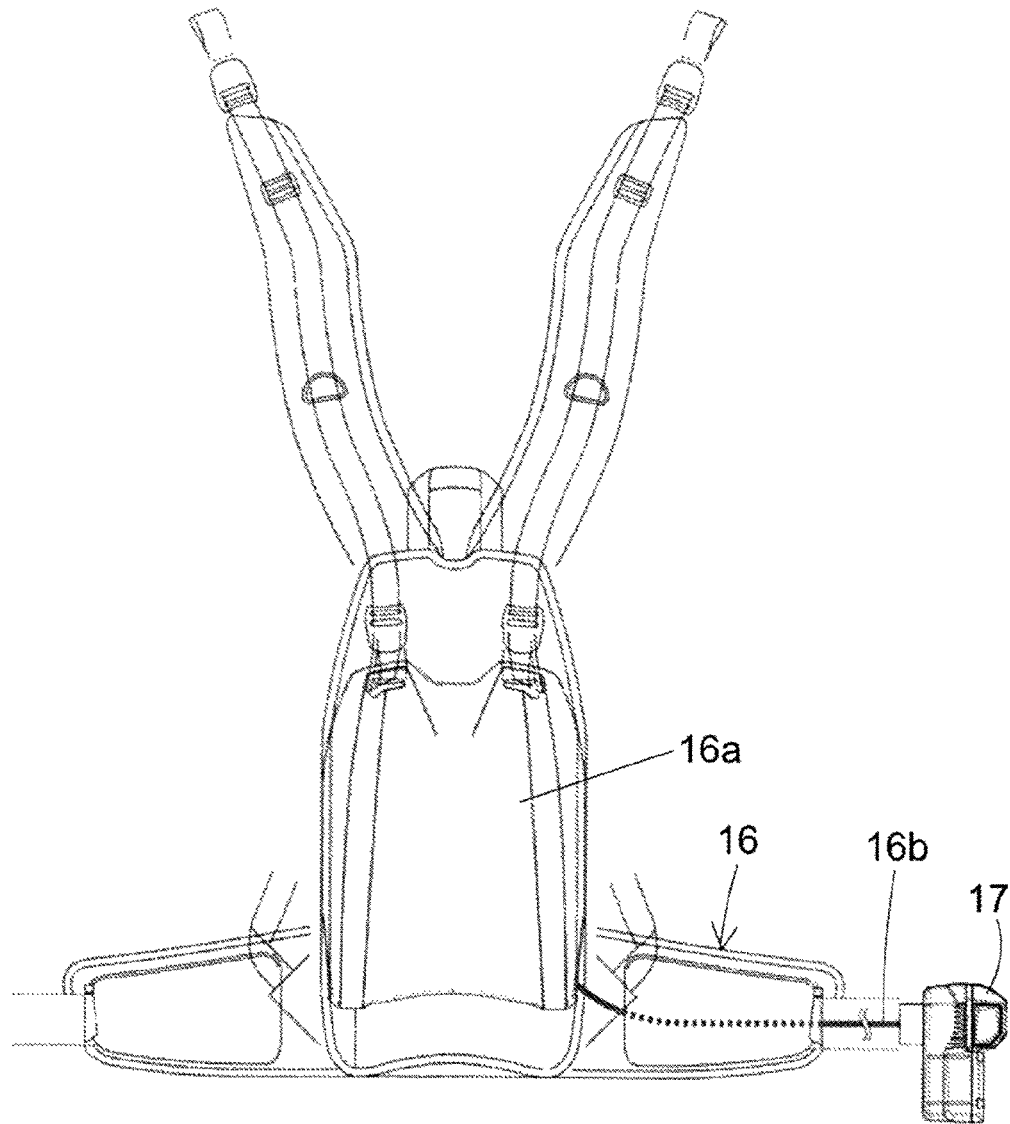
FIG. 7 is an appearance view of a backpack type battery 16.

FIG. 1 is a perspective view of a bush cutter according to an illustrative embodiment of the present invention. FIG. 2 is a schematic view showing a state where a worker holds the bush cutter of FIG. 1. FIG. 3 is an enlarged side view showing a battery-side housing 3 of the bush cutter of FIG. 1. FIG. 4 is a sectional view taken along a line A-A of FIG. 3. Here, FIGS. 1 to 3 show a state where a weight is not mounted to the bush cutter and FIG. 4 shows a state where a weight is mounted to the bush cutter. FIG. 5A is a front view of a weight unit 18 shown in FIG. 4, FIG. 5B is a bottom view thereof, FIG. 5C is a right side view thereof and FIG. 5D is a rear view thereof. FIG. 6 is an exploded view of the weight unit 18 shown in FIG. 4. FIG. 7 is an appearance view of a backpack type battery 16.

A bush cutter as an example of an electric working machine includes an operation rod 1, a cutting blade unit 2, a battery-side housing 3, a band connection portion 4, a shoulder band 5, a length adjustment unit 6 and a handle portion 20. The cutting blade unit 2 is provided at a front end of the operation rod 1 and includes, for example, a disc motor which is provided in a head housing 2a and drives an unshown cutting blade which is substantially disc-shaped and formed at its peripheral edge with a saw-tooth. The battery-side housing 3 is provided at a rear end of the operation rod 1 and a battery pack 301 (battery) as a battery can be detachably mounted to the battery-side housing. The operation rod 1 is adapted to mechanically couple with (connect to) the cutting blade unit 2 and the battery-side housing 3. Further, wiring (not shown) is inserted through the inside of the operation rod 1 and electrically connects the cutting blade unit 2 and the battery-side housing 3. Electric power is supplied from the battery-side housing 3 to the cutting blade unit 2 via the wiring. The band connection portion 4 is provided at a predetermined position of the operation rod 1 and the shoulder band 5 can be attached to the band connection portion 4. The length adjustment unit 6 is intended to adjust the length of the operation rod 1. The handle portion 20 is provided at a predetermined position of the operation rod 1. Although the handle portion 20 is one-handed portion in the illustrated example, the hand portion may be both-handed portion which is branched into two. Adjustment of a rotational speed of the cutting blade is performed by adjusting a pulling amount of an operation lever 21. When the pulling amount is increased, a supply amount of electric power from the battery-side housing 3 to the cutting blade unit 2 is increased and therefore the rotational speed of the cutting blade is increased.

As shown in FIG. 2, a worker wears the shoulder band 5 and performs a mowing operation by reciprocating the operation rod 1 from side to side in a state where the operation rod 1 is tilted about the band connection portion 4 coupled to the shoulder band 5 and thus the cutting blade unit 2 is held in the vicinity of the ground. For this purpose, it is preferable that a gravity center position of the front and rear balance of the bush cutter is located in a state where a distance between the ground and the cutting blade unit 2 is shortest or the cutting blade unit 2 is lightly in contact with the ground. That is, when the gravity center position is located at a too forward position, the cutting blade unit 2 is floated and therefore workability is poor. On the contrary, when the gravity center position is located at a too rearward position, moment due to the weight of the cutting blade unit 2 is increased and therefore workability is poor. Accordingly, from the viewpoint of workability, it is important to properly set the gravity center position for the front and rear balance. However, the gravity center position for the optimal front and rear balance of the bush cutter is changed in accordance with product specifications such as a length of the operation rod 1 and positions and lengths of the length adjustment unit 6 and the shoulder band 5 (position of the band connection portion 4) and is also different in accordance with a height, body type, feeling, etc. of a worker. Further, when the battery pack 301 is detached, and instead, an adapter 17 (which is provided at a leading end of a cable 16b extending from a battery body 16a) for the backpack type battery 16 (as shown in FIG. 7, for example) is mounted, the adapter 17 does not include a battery cell and is therefore lightweight as compared to the battery pack 301, so that the gravity center position of the bush cutter is changed (shifted forward).

Taking this into account, in the present embodiment, since the gravity center position of the bush cutter can be adjusted afterwards, an optimal gravity center position can be obtained even when the product specifications, a worker or the type of power source is changed.

The battery-side housing 3 is provided with a hole portion 7 for inserting a weight. The hole portion 7 can also be utilized as a handle and is provided in an upper part of the battery-side housing 3. The hole portion 7 has a shape which does not give a sense of discomfort to a finger even when a finger enters the hole portion. As shown in FIG. 4, a weight unit 18 is mounted (attached) to the hole portion 7.

As shown in FIG. 4 to FIG. 6, the weight unit 18 includes a plurality of weights 8, a front cover 14, a screw 15, a rear cover 12 and a nut 13. The plurality of weights 8 are made of iron plates having the same shape, for example. The front cover 14 and the rear cover 12 are made of iron plates much larger than the weights 8, for example. The nut 13 is fixed (for example, integrally welded) to the rear cover 12 so as to stand up from a predetermined position (for example, a central portion) of the rear cover 12. The screw 15 is screwed to the nut 13. As shown in FIG. 6, a through-hole 8a is provided in the weight 8 and a through hole 14a is provided in the front cover 14. At least one of a screw shaft 15a of the screw 15 and the nut 13 of the rear cover 12 is intended to pass through the through-holes 8a, 14a. By tightening the screw 15 against the nut 13, the weights 8 are sandwiched between the front cover 14 and the rear cover 12.

The front cover 14 is larger than the hole portion 7 and completely covers one-side opening of the hole portion 7. Similarly, the rear cover 12 is larger than the hole portion 7 and completely covers the other-side opening of the hole portion 7. The opening of the hole portion 7 is formed with a stepped portion 9 to which the front cover 14 and the rear cover 12 is engaged (preferably fitted). A width of a cover abutting surface of the stepped portion 9 is 2 mm, for example. A plurality of weights 8 are fitted into the hole portion 7 provided in the battery-side housing 3 and is sandwiched from both ends thereof by the front cover 14 and the rear cover 12, which are slightly larger than the weights 8. By engagement of the front cover 14 and the rear cover 12 and the stepped portion 9, the weights 8 are fixed so as not to move in an upper-lower direction, a left-right direction and a front-rear direction. Upon assembling the weight unit 18, the weight unit 18 is tightened by passing the weights 8 and the front cover 14 over the nut 13 attached to one side of the rear cover 12 and passing the screw 15 into the nut 13 from the front cover 14 side. Here, the number of the weights 8 can be arbitrarily selected in accordance with an adjustment amount of the gravity center position. At this time, when the number of the weights 8 is reduced, a gap is generated between the front cover 14 and the rear cover 12 and so the weights 8 can be moved in an axial direction of the screw 15. However, even in this case, by filling an elastic body 19 such as a sponge into the gap corresponding to the reduced number of the weights 8, as shown in FIG. 6, it is possible to restrict movement (sliding along an axis) of the weights 8.

As shown in FIG. 4, a heatsink 32 (made of aluminum, for example) having an L-shaped cross section is fixed to an internal position of the battery-side housing 3 located below the hole portion 7 and a substrate 31 is screwed to the heatsink 32. An L-shaped upright portion 32a of the heatsink 32 is closely opposed to an inner surface of the hole portion 7 and therefore heat radiation performance is improved.

According to the present embodiment, the weight unit 18 is mounted to the hole portion 7 of the battery-side housing 3 and therefore the gravity center position of the bush cutter can be adjusted afterwards. Further, the number of the weights 8 to be used in the weight unit 18 can be arbitrarily selected in accordance with an adjustment amount of the gravity center position and therefore flexible adjustment of the gravity center position can be performed. For this reason, an optimal gravity center position can be obtained even when the product specifications, a worker or the type of power source is changed, so that workability is improved. Specifically, a worker can adjust the gravity center position to a position where work efficiency is high, in response to specifications of the bush cutter, capacity of the battery pack to be mounted, whether an external power source is used or not, and a height or body type of a worker. Furthermore, since various gravity center positions can be taken in the same bush cutter, it is possible to reduce environmental load.

Figure 8:
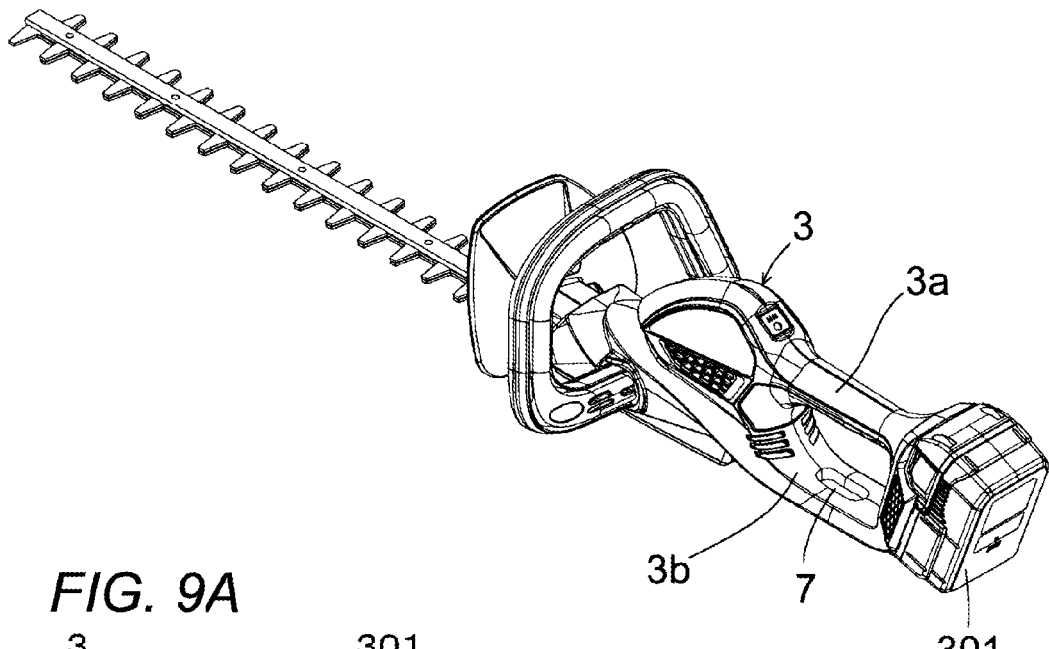
FIG. 8 is a perspective view of a hedge trimmer according to an illustrative embodiment of the present invention.

FIG. 8 is a perspective view of a hedge trimmer according to an illustrative embodiment of the present invention. The electric working machine is not limited to the bush cutter shown in FIG. 1, etc., but may be a hedge trimmer shown in FIG. 8, for example. The hedge trimmer includes the hole portion 7 for insertion of a weight, which is provided to a support portion 3b facing a grip portion 3a of the housing 3 having the battery pack 301 detachably mounted thereto. Similar to the bush cutter, the weight unit 18 can be attached to the hole portion 7.

Figure 9A:
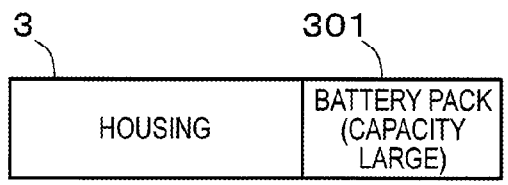
FIG. 9A to 9C are schematic views of a configuration to adjust a gravity center position of the electric working machine (part 1)
Figure 9B:
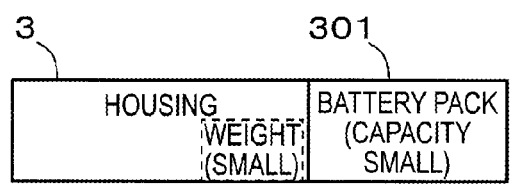
Figure 9C:
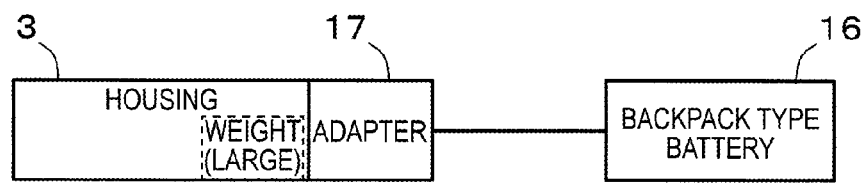

FIG. 9 is a schematic view of a configuration for adjusting the gravity center position of the electric working machine (part 1). In the example of FIG. 9, the weight is mounted directly to the housing 3 and this example corresponds to the above-described embodiment. When a large-capacity battery pack 301 is mounted, the weight is not attached (FIG. 9A). When a small-capacity battery pack 301 is mounted, a small weight is attached (FIG. 9B). When electric power is supplied from an external power source such as the backpack type battery 16 (when the adapter 17 instead of the battery pack 301 is mounted), a large weight is attached (FIG. 9C).

Figure 10:
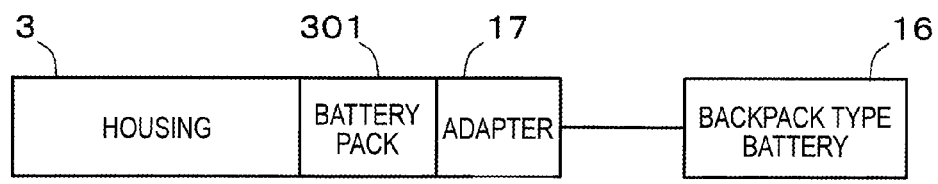
FIG. 10 is a schematic view of a configuration to adjust the gravity center position of the electric working machine (part 2)
Figure 12:
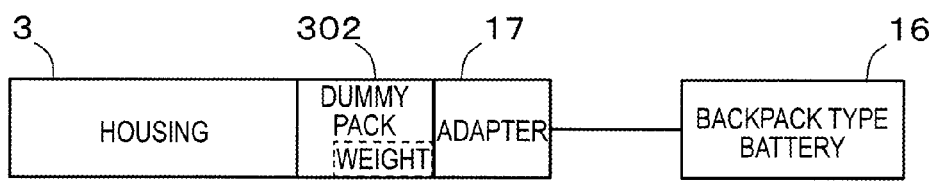
FIG. 12 is a schematic view of a configuration to adjust the gravity center position of the electric working machine (part 4).

FIG. 10 is a schematic view of a configuration to adjust the gravity center position of the electric working machine (part 2). In the example of FIG. 12, when electric power is supplied from an external power source such as the backpack type battery 16, the battery pack 301 is not detached and the adapter 17 is mounted to the battery pack 301. When capacity of the battery pack 301 is equal to or less than a predetermined amount, electric power is supplied from the backpack type battery 16. In this case, although the weight is increased by the amount of the adapter 17, the adapter 17 is lightweight and therefore hardly affects the gravity center position as a whole.

Figure 11:
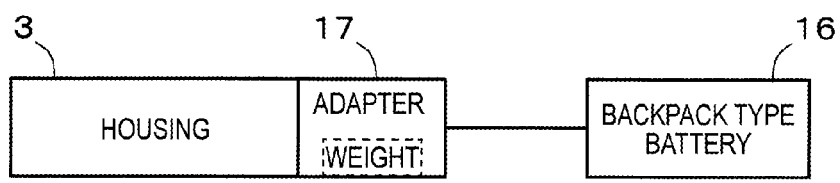
FIG. 11 is a schematic view of a configuration to adjust the gravity center position of the electric working machine (part 3)

FIG. 11 is a schematic view of a configuration for adjusting the gravity center position of the electric working machine (part 3). In the example of FIG. 11, when electric power is supplied from an external power source such as the backpack type battery 16 (when the adapter 17 instead of the battery pack 301 is mounted), the weight is added to the adapter 17 itself. Since there are no battery cells inside the adapter 17 and therefore an extra space is present in the adapter, the weight such as iron may be fitted into the space. Weight of the weight may be variable. As a result, it is possible to obtain an optimal gravity center position even when the adapter 17 is mounted instead of the battery pack 301.

FIG. 12 is a schematic view of a configuration to adjust the gravity center position of the electric working machine (part 4). Instead of the battery pack 301 of FIG. 11, a dummy pack 302 is mounted to the housing 3 and the adapter 17 is mounted to the dummy pack 302. Although an outer shape of the dummy pack 302 is equivalent or similar to the battery pack 301, a battery cell is not included in the dummy pack and the weight is provided inside the dummy pack. Weight of the weight may be variable. As a result, it is possible to obtain an optimal gravity center position.

While description has been made in connection with embodiments of the present invention, it will be obvious to those skilled in the art that various changes and modification may be made therein without departing from the present invention. A modification thereof will be described.

The electric working machine is not limited to those described in the illustrative embodiments but may be various electric tools such as a belt sander, a rotary band saw, a blower and a chain saw.

The weight unit 18 may be attached to, for example, a lower surface of the battery-side housing 3, instead of the hole portion 7 of the battery-side housing 3.

The present invention provides illustrative, non-limiting aspects as follows:

(1) In a first aspect, there is provided an electric working machine including: a housing to which a battery is configured to be detachably mounted, wherein the housing is configured such that a weight unit including a weight can be mounted to the housing.

(2) In a second aspect, there is provided the electric working machine according to the first aspect, wherein the weight is configured to be variable in weight.

(3) In a third aspect, there is provided the electric working machine according to the first or second aspect, wherein the housing includes a hole portion in which the weight is configured to be disposed.

(4) In a fourth aspect, there is provided the electric working machine according to the third aspect, wherein the weight unit includes a cover portion configured to cover an opening of the hole portion.

(5) In a fifth aspect, there is provided the electric working machine according to the fourth aspect, wherein the opening of the hole portion includes a stepped portion to which the cover portion is configured to engage.

(6) In a sixth aspect, there is provided the electric working machine according to the fourth or fifth aspect, wherein the hole portion is a through-hole, and wherein the cover portion is configured to be provided to both openings of the hole portion.

(7) In a seventh aspect, there is provided the electric working machine according to the sixth aspect, wherein the weight unit further includes a shaft portion extending into the hole portion from at least one of the cover portions, and wherein the weight includes a plurality of plates each including a through-hole through which the shaft portion passes and both cover portions are detachably fixed to each other via the shaft portion.

(8) In an eighth aspect, there is provided the electric working machine according to any one of the fourth to sixth aspects, wherein the weight unit further includes a shaft portion extending into the hole portion from the cover portion, and wherein the weight includes a plurality of plates each including a through-hole through which the shaft portion passes.

(9) In a ninth aspect, there is provided the electric working machine according to the seventh or eighth aspect, wherein the weight unit further includes an elastic body having a through-hole through which the shaft portion passes, wherein the plates are restricted from sliding in an axial direction of the plates when the elastic body is arranged side by side to the plates.

(10) In a tenth aspect, there is provided the electric working machine according to the first or second aspect, wherein an adapter is configured to be detachably mounted to the housing instead of the battery and is configured to receive electric power from an external power source, and wherein the weight unit is provided to the adapter.

(11) In an eleventh aspect, there is provided the electric working machine according to the first or second aspect, wherein a dummy pack is configured to be detachably mounted to the housing instead of the battery, wherein an adapter is mounted to the dummy pack and is configured to receive electric power from an external power source, and wherein the weight unit is provided to the dummy pack.

(12) In a twelfth aspect, there is provided an electric working machine including: a housing, a battery mounted to the housing, and an adapter detachably mounted to the battery and configured to receive electric power from an external power source, wherein the electric working machine is configured to be operated by using the electric power from the external power source.

(13) In a thirteenth aspect, there is provided an electric working machine system including: an electric working machine including a housing: a battery configured to be detachably mounted to the housing; and a weight unit including a weight and configured to be detachably mounted to the housing.

(14) In a fourteenth aspect, there is provided the electric working machine system according to the thirteenth aspect, wherein the weight is configured to be variable in weight.

(15) In a fifteenth aspect, there is provided the electric working machine system according to the thirteenth or fourteenth aspect, further including an adapter which is configured to be detachably mounted to the housing instead of the battery and is configured to receive electric power from an external power source, wherein the weight unit is provided to the adapter.

(16) In a sixteenth aspect, there is provided the electric working machine system according to the thirteenth or fourteenth aspect, further including: a dummy pack which is configured to be detachably mounted to the housing instead of the battery; and an adapter which is mounted to the dummy pack and is configured to receive electric power from an external power source, wherein the weight unit is provided to the dummy pack.

Any combinations of the above-described components and modifications into a method or system are also effective as an aspect of the present invention.

What is claimed is:

1. A bush cutter machine comprising:
   a battery;
   a housing including a portion to which the battery is configured to be detachably mounted;
   an adapter configured to be detachably mounted to the portion when the battery is not mounted to the portion, the adapter being configured to receive electric power from an external power source, having a box-shape with a space therein, and being lightweight as compared to the battery;
   a weight unit including a weight which is accommodated in the space inside the adapter, the weight unit being configured to be detachably mounted to the housing independently of the battery by detachably mounting the adapter to the portion;
   a handle;
   an operation rod to which the handle portion is provided;
   a cutting blade unit provided at a front end of the operation rod; and
   a motor that drives an operation tool,
   wherein, in a longitudinal direction of the electric working machine, the weight unit is provided on an opposite side of the motor with the handle located therebetween, and
   wherein the housing is provided at a rear end of the operation rod.

2. The bush cutter according to claim 1, wherein the weight is configured to be variable in weight.

3. The bush cutter according to claim 1, wherein the housing includes a hole portion in which a weight is configured to be disposed.

4. The bush cutter according to claim 3, wherein the weight unit includes a cover portion configured to cover an opening of the hole portion.

5. The bush cutter according to claim 4, wherein the opening of the hole portion includes a stepped portion to which the cover portion is configured to engage.

6. The bush cutter according to claim 4, wherein the hole portion is a through-hole, and
   wherein the cover portion is configured to be provided to both openings of the hole portion.

7. The bush cutter according to claim 6, wherein the weight unit further includes a shaft portion extending into the hole portion from at least one of the cover portions, and wherein the weight includes a plurality of plates each including a through-hole through which the shaft portion passes and both cover portions are detachably fixed to each other via the shaft portion.

8. The bush cutter according to claim 7,
wherein the weight unit further includes an elastic body having a through-hole through which the shaft portion passes, and
wherein the plates are restricted from sliding in an axial direction of the plates when the elastic body is arranged side by side to the plates.

9. The bush cutter according to claim 4,
wherein the weight unit further includes a shaft portion extending into the hole portion from the cover portion, and
wherein the weight includes a plurality of plates each including a through-hole through which the shaft portion passes.

10. The bush cutter according to claim 1, wherein the external power source is a backpack type battery.

* * * * *